United States Patent Office 2,835,625
Patented May 20, 1958

2,835,625
ISOPROPOXYCARBONYL DIMETHYLDITHIO-CARBAMATE

Chien-Pen Lo and W E Craig, Philadelphia, Pa., assignors to Rohm & Haas Company, Philadelphia, Pa., a corporation of Delaware No Drawing. Application January 19, 1956
Serial No. 560,070

3 Claims. (Cl. 167—22)

This invention concerns isopropoxycarbonyl dimethyldithiocarbamate and its use as a fungicide for protecting plants from fungal diseases.

We prepared methoxycarbonyl dimethyldithiocarbamate quite a long time ago and found that it rapidly decomposed. In fact, a preparation completed on a Friday afternoon was completely decomposed by Monday morning. It was noted that others have indicated that this compound was unstable. While the corresponding ethoxycarbonyl dimethyldithiocarbamate is somewhat more stable, it decomposes rapidly in the presence of metals. We prepared butoxycarbonyl and the β-chloroethoxycarbonyl dimethyldithiocarbamate and found that these too were unstable. These various esters were so unstable that they could not be prepared in a metal apparatus, the metal surfaces apparently catalyzing decomposition.

In contrast to the above observations, we found unexpectedly that isopropoxycarbonyl dimethyldithiocarbamate, which is a solid, is relatively stable, and it has been stored at room temperature over a considerable period of time without any change in composition. Furthermore, it has sufficient stability to be made in metal equipment.

This compound is prepared by reacting a soluble salt of dimethyldithiocarbamic acid with isopropyl chloroformate. The reaction is most conveniently effected in an inert solvent, such as dimethylformamide, acetone, benzene, ethers, or even water at a temperature below about 20° C., a range of −10° to 20° C. being generally useful.

For example, solid anhydrous sodium dimethyldithiocarbamate (315 parts by weight) was dissolved in 915 parts by weight of dimethylformamide. To this solution, cooled to about 10° C., was slowly added 245 parts by weight of isopropyl chloroformate, while the mixture was stirred and maintained below 10° C. by external cooling. The reaction mixture was further stirred for an hour. It was poured into 3000 parts of water. A yellow solid formed. It was filtered off, washed with water, and dried in air to give 386 parts of product. This material corresponded in composition to isopropoxycarbonyl dimethyldithiocarbamate. It melted at 61°–62° C. After it was recrystallized from ethanol, the melting point was still 61°–62° C. The nitrogen analysis was 6.8% and the sulfur analysis was 30.3% (theory 6.8% and 30.9% respectively).

In another preparation, 717 parts of isopropyl chloroformate were slowly added to a solution of 2200 parts of sodium dimethyldithiocarbamate in a mixture of 4440 parts of water and 800 parts of acetone which was cooled below 10° C. by means of an ice bath. The mixture was stirred for an hour. About 800 parts of water was added and the resulting mixture was stirred for a half hour. A yellow solid formed, was filtered off, and was dried to give 855 parts of product. It gave an analysis corresponding to that of isopropoxycarbonyl dimethyldithiocarbamate. It melted at 60°–61° C.

Samples of the above product were left in contact with strips of iron, stainless steel, and copper at steam bath temperatures for over 24 hours without evidence of decomposition. A portion was heated for two hours at 100° C. on strips of iron, likewise without decomposition. Another sample was heated to 160° C. without decomposition.

In contrast, a sample of ethoxycarbonyl dimethyldithiocarbamate was warmed on an iron surface on a steam bath. A copious evolution of gas rapidly occurred, leaving a residue containing no sulfur and being fungicidally inactive.

In standard fungitoxicity tests, isopropoxycarbonyl dimethyldithiocarbamate was found to have an $LD_{50}$ value of 1 to 5 p. p. m. against both *Stemphylium sarcinaeforme* and *Monilinia fructicola*.

We also prepared isobutoxycarbonyl dimethyldithiocarbamate (from sodium dimethyldithiocarbamate and isobutyl chloroformate). This compound is an oil. We likewise prepared sec-butoxycarbonyl dimethyldithiocarbamate, also an oil. Both showed good fungitoxicity, having $LD_{50}$ values of 5–7.5 p. p. m. and 10 p. p. m. respectively. Neither, however, was stable on metal surfaces.

Isopropoxycarbonyl dimethyldithiocarbamate may be formulated in dusts, wettable powders, or emulsion concentrates for protecting plants against attack by fungi. These preparations may be applied to or about any plant organ, including seed, stem, leaf, or fruit. Thus, this compound can be mixed with a neutral or acid clay, talc, or other conventional, finely divided solid diluent. Basic diluents are to be avoided. Finely divided sulfur is a good diluent and also an active agent.

The compound may similarly be extended with an inert organic solvent together with solvent-soluble emulsifying agent. This is a peculiar and unique property of this substance, for as far as we can determine, there is no other effective fungicide which can be used in an emulsifiable concentrate. Such compositions are usually diluted with water for application, as for spraying on foliage or into soil.

An emulsion concentrate can be made, for example, from 25 parts of isopropoxycarbonyl dimethyldithiocarbamate, 70 parts of an aromatic naphtha, one part of calcium dodecylbenzenesulfonate, and four parts of tert-octylphenoxypolyethoxyethanol wetting agent.

A typical wettable powder may be made by mixing 25 parts of isopropoxycarbonyl dimethyldithiocarbamate, 73 parts of a clay having a pH of 6, one part of a condensed naphthalene-formaldehyde sodium sulfonate, and one part of dry mixture containing 20% of an octylphenoxypolyethoxyethanol wetting agent on magnesium carbonate. Wettable powders may be applied from aqueous sprays or used in dusts.

A 5% or 10% dust may be similarly prepared, the wetting and dispersing agents being reduced in amount or even omitted. Dusts may be applied to plants by being blown onto foliage, by being mixed with soil, or by being dusted onto seeds.

In plate tests isopropoxycarbonyl dimethyldithiocarbamate at 10 p. p. m. was found to prevent growth of such typical fungi as *Sclerotinia rolfsii* (southern blight of legumes), *Sclerotinia sclerotiorum* (stem rot of soya bean), *Rhizoctonia solani* (damping off of cotton), *Pythium ultimum* (root rot of muskmelon, seedling blight of lettuce, pear, corn, etc.), *Pythium aphanidermatum* (pythium root rot of cucurbits), *Phytophthora citrophthora* (fruit rot of citrus trees), *Phytophthora cinnamomi* (phytophthora root disease of avocados, pineapple, and chestnut), *Phytophthora cactorum* (root rot of clover, crown rot of walnuts), *Armillaria mellea* (oak root fungus), and others, including *Streptomyses scabies* and

*Sclerotium rolfsii.* The compound has also been shown to be effective in admixtures with soils. Methods of test are described by Zentmyer in Phytopathology 45, 398 (1955). At levels of 10 to 100 p. p. m. in soils isopropoxycarbonyl dimethyldithiocarbamate is effective in controlling pathogens which incite diseases of underground origin of numerous and diverse important agricultural crops.

The compound has been exposed to ultraviolet light from an arc for a period of four hours and then biologically evaluated. No loss in activity was observed.

It can be used in conjunction with other non-basic fungicidal agents, insecticides, miticides, and the like. For example, for an excellent, all-purpose garden spray, there can be mixed 22 parts of 1,1-bis(chlorophenyl)-2,2-dichloroethane, 11 parts of 1,1-bis(chlorophenyl)-2,2,2-trichloroethanol, 6 parts of lindane (gamma isomer of hexachlorocyclohexane), 11 parts of isopropoxycarbonyl dimethyldithiocarbamate, 8 parts of an oil soluble emulsifying agent or composition, and 42 parts of an aromatic naphtha. A useful emulsifying composition can be composed of one part of the calcium salt of dioctyl succinosulfonic acid and three parts of a tert-octylphenoxypolyethoxyethanol. This composition has been found stable even after storage of about a year, as measured by biological tests.

Isopropoxycarbonyl dimethyldithiocarbamate may likewise be mixed with such an insecticide as bis(diethylphenyl)dichloroethane or as malathion, or with the miticide and fungicide dinitrocaprylphenyl crotonate, or with mixtures of these various agents.

A peculiar property of isopropoxycarbonyl dimethyldithiocarbamate is found in its capacity to control various bacteria which can attack plants. For example, it is active against a fermenting bacterium and a marbling bacterium found in soils. Because of this property and in conjunction with its fungistatic and fungicidal activity against many kinds of pathogens, it is a desirable agent for treating growing plants, particularly the underground organs, including seed and root system.

We claim:

1. As a new chemical compound, isopropoxycarbonyl dimethyldithiocarbamate.

2. A process for controlling fungi on living plants which comprises supplying to a fungus-infested environment thereof isopropoxycarbonyl dimethyldithiocarbamate.

3. A process for controlling disease-causing micro-organisms on the underground portions of plants which comprises supplying to a fungus-infested environment of said portions isopropoxycarbonyl dimethyldithiocarbamate.

References Cited in the file of this patent

UNITED STATES PATENTS

| | | |
|---|---|---|
| 2,085,401 | Twiss et al. | June 29, 1937 |
| 2,541,678 | Swaney et al. | Feb. 13, 1951 |

OTHER REFERENCES

Quevauviller et al.: Chem. Abs. 46, col. 4175 (1952).
Kerk et al.: Rec. Trav. Chim. 71, pp. 1179–97 (1952).